United States Patent
Ferrari et al.

(10) Patent No.: US 11,144,775 B2
(45) Date of Patent: Oct. 12, 2021

(54) SYSTEM AND METHOD FOR ILLUMINATING THE FIELD OF VIEW OF A VISION-BASED SENSOR MOUNTED ON AN AGRICULTURAL MACHINE

(71) Applicants: CNH Industrial Canada, Ltd., Saskatoon (CA); Autonomous Solutions, Inc., Mendon, UT (US)

(72) Inventors: Luca Ferrari, Modena (IT); Taylor C. Bybee, Logan, UT (US); Bret T. Turpin, Wellsville, UT (US); Jeffrey L. Ferrin, Smithfield, UT (US); John H. Posselius, Ephrata, PA (US); James W. Henry, Saskatoon (CA)

(73) Assignees: CNH Industrial Canada, Ltd., Saskatoon (CA); Autonomous Solutions, Inc., Mendon, UT (US)

( * ) Notice: Subject to any disclaimer, the term of this patent is extended or adjusted under 35 U.S.C. 154(b) by 455 days.

(21) Appl. No.: 16/016,825

(22) Filed: Jun. 25, 2018

(65) Prior Publication Data
US 2019/0392239 A1    Dec. 26, 2019

(51) Int. Cl.
*G06K 9/20* (2006.01)
*A01B 79/02* (2006.01)
*A01B 79/00* (2006.01)

(52) U.S. Cl.
CPC .......... *G06K 9/2027* (2013.01); *A01B 79/005* (2013.01); *A01B 79/02* (2013.01); *G06K 2207/1018* (2013.01)

(58) Field of Classification Search
CPC ............ G06K 9/2027; G06K 2209/27; G06K 7/10366; G06K 9/22; G06K 9/46;
(Continued)

(56) References Cited

U.S. PATENT DOCUMENTS

| | | |
|---|---|---|
| 4,843,561 A | 6/1989 | Larson |
| 6,160,902 A | 12/2000 | Dickson et al. |

(Continued)

FOREIGN PATENT DOCUMENTS

| | | |
|---|---|---|
| CN | 204244348 U | 4/2015 |
| DE | 102004062462 A1 | 5/2007 |

(Continued)

OTHER PUBLICATIONS

Chung et al., Effect of light illumination and camera on moving image quality, Influence of lighting and camera moving speed on soil image, Korean Journal of Agricultural Science, Research Institute of Agricultural Science, vol. 39, Issue 3, 2012, pp. 407-412. http://www.dbpia.co.kr/Journal/ArticleDetail/NODE01983952 (Abstract Only).

*Primary Examiner* — Luis A Martinez Borrero
(74) *Attorney, Agent, or Firm* — Rebecca L. Henkel; Rickard K. DeMille

(57) ABSTRACT

In one aspect, a system for illuminating a field of view of a vision-based sensor mounted on an agricultural machine may include an agricultural machine having a vision-based sensor. The system may also include a light source configured to emit supplemental light to illuminate at least a portion of the field of view of the vision-based sensor. Furthermore, the system may include a controller communicatively the light source. The controller may configured to control an operation of the light source based on an input indicative of ambient light present within the field of view of the vision-based sensor.

17 Claims, 4 Drawing Sheets

(58) Field of Classification Search
CPC ............ G06K 2207/1018; A01B 79/02; A01B 79/005; A01B 9/02; A01B 49/02; A01B 69/001; A01B 76/00; H04N 5/247; H04N 5/23229; H04N 5/2252; H04N 5/2251
See application file for complete search history.

(56) References Cited

U.S. PATENT DOCUMENTS

| | | | |
|---|---|---|---|
| 7,619,680 | B1 | 11/2009 | Bingle et al. |
| 7,777,778 | B2 | 8/2010 | Scharenbroch et al. |
| 9,148,995 | B2 | 10/2015 | Hrnicek et al. |
| 9,282,688 | B2 | 3/2016 | Casper et al. |
| 9,345,194 | B2 | 5/2016 | Schroeder et al. |
| 9,462,749 | B1 | 10/2016 | Jens et al. |
| 9,554,098 | B2 | 1/2017 | Casper et al. |
| 10,057,500 | B2* | 8/2018 | Shih ................. G06K 9/2027 |
| 10,158,793 | B2* | 12/2018 | Boyle ................ H04N 5/2256 |
| 10,182,214 | B2* | 1/2019 | Gornik ................ H04N 7/185 |
| 10,438,343 | B2* | 10/2019 | Baurer ................ A01G 22/00 |
| 10,568,316 | B2* | 2/2020 | Gall ................... A01M 7/0089 |
| 10,657,387 | B2* | 5/2020 | Ji ....................... G05D 1/0246 |
| 10,721,857 | B2* | 7/2020 | Tippery .............. A01B 69/008 |
| 2009/0268023 | A1 | 10/2009 | Hsieh |
| 2012/0083982 | A1* | 4/2012 | Bonefas .............. G05D 1/0223 701/70 |
| 2012/0206050 | A1* | 8/2012 | Spero .................. F21S 41/147 315/152 |
| 2013/0325242 | A1* | 12/2013 | Cavender-Bares .. A01C 21/005 701/25 |
| 2014/0168412 | A1 | 6/2014 | Shulman et al. |
| 2014/0198219 | A1* | 7/2014 | Chuang ............... H04N 5/2354 348/164 |
| 2015/0015697 | A1* | 1/2015 | Redden .................... A01G 7/00 348/89 |
| 2015/0142250 | A1* | 5/2015 | Cavender-Bares .. A01C 23/008 701/23 |
| 2015/0163390 | A1* | 6/2015 | Lee ..................... H04N 5/2352 348/149 |
| 2015/0363914 | A1* | 12/2015 | Boyle ................... G01C 11/02 345/629 |
| 2017/0112043 | A1 | 4/2017 | Nair et al. |
| 2017/0223947 | A1* | 8/2017 | Gall .................... G01N 21/4738 |
| 2017/0251589 | A1* | 9/2017 | Tippery ................ A01G 25/09 |
| 2017/0374323 | A1* | 12/2017 | Gornik ................. H04N 7/185 |
| 2018/0060675 | A1* | 3/2018 | Ji ........................ G05D 1/0246 |
| 2018/0084179 | A1* | 3/2018 | Shih .................... G06K 9/2027 |
| 2018/0092295 | A1* | 4/2018 | Sugumaran .......... A01C 23/007 |
| 2018/0108123 | A1* | 4/2018 | Baurer ..................... A01G 7/00 |
| 2018/0113200 | A1* | 4/2018 | Steinberg ............. G02B 26/10 |
| 2018/0319396 | A1* | 11/2018 | Foster ............... B60W 30/0956 |
| 2018/0325012 | A1* | 11/2018 | Ferrari ................. A01B 69/008 |
| 2018/0336410 | A1* | 11/2018 | Posselius ........... G06K 9/00657 |
| 2019/0008019 | A1* | 1/2019 | Le Henaff .............. H05B 47/11 |
| 2019/0014723 | A1* | 1/2019 | Stanhope ............. A01G 75/185 |
| 2019/0095721 | A1* | 3/2019 | Ion ...................... G06K 9/6267 |
| 2019/0162823 | A1* | 5/2019 | Eckstein ................ G01C 21/28 |
| 2019/0373801 | A1* | 12/2019 | Schoeny ............... A01B 79/005 |
| 2019/0383650 | A1* | 12/2019 | Ferrari .................. G01D 9/005 |
| 2020/0053297 | A1* | 2/2020 | Tokizaki ................ G01J 5/0846 |
| 2020/0352088 | A1* | 11/2020 | Arnett .................... A01C 5/062 |
| 2020/0359550 | A1* | 11/2020 | Tran ..................... G06T 7/0002 |

FOREIGN PATENT DOCUMENTS

| | | |
|---|---|---|
| EP | 2743768 A1 | 6/2014 |
| WO | WO2017/181127 A1 | 10/2017 |

* cited by examiner

SYSTEM AND METHOD FOR ILLUMINATING THE FIELD OF VIEW OF A VISION-BASED SENSOR MOUNTED ON AN AGRICULTURAL MACHINE

FIELD

The present disclosure generally relates to agricultural machines, such as agricultural vehicles and implements, and, more particularly, to systems and methods for selectively illuminating the field of view of a vision-based sensor mounted on an agricultural machine.

BACKGROUND

Agricultural implements, such as cultivators, disc harrows, seeders, and/or the like, perform one or more agricultural operations while being towed across a field by a suitable work vehicle, such as in agricultural tractor. In this regard, agricultural implements often include one or more sensors mounted thereon to monitor various parameters associated with the performance of such agricultural operations. For example, some agricultural implements include one or more cameras or other vision-based sensors that capture images of the soil and/or plants within the field. Thereafter, such images may be processed or analyzed to determine one or more parameters associated with the condition of soil and/or plants, such as parameters related to soil roughness, plant health, weed growth, and/or the like.

Vision-based sensors require a certain amount of ambient light to capture images from which soil and/or plant parameters may be accurately determined. Specifically, when low ambient light conditions exist within the field of view of a camera, the captured images may be too dark for accurately determining the soil and/or plant parameters. For example, shadows caused by the location of the implement relative to the sun may reduce the amount of ambient light present within the field of view of the camera. The dark images may result in inaccurate determinations of the desired soil and/or plant parameters. For instance, dark images may result in inaccurate weed growth determinations. Farmers may then perform herbicide spraying operations based on the incorrect weed growth determinations.

Accordingly, an improved system and method for illuminating the field of view of a vision-based sensor mounted on an agricultural machine would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for illuminating a field of view of a vision-based sensor mounted on an agricultural machine. The system may include an agricultural machine having a vision-based sensor. The system may also include a light source configured to emit supplemental light to illuminate at least a portion of the field of view of the vision-based sensor. Furthermore, the system may include a controller communicatively the light source. The controller may configured to control an operation of the light source based on an input indicative of ambient light present within the field of view of the vision-based sensor.

In another aspect, the present subject matter is directed to a method for illuminating a field of view of a vision-based sensor mounted on an agricultural machine. The system may include receiving, with a computing device, data from the vision-based sensor as the agricultural machine is moved across a field. The system may also include receiving, with the computing device, an input indicative of ambient light present within the field of view of the vision-based sensor. Furthermore, the system may include controlling, with the computing device, an operation of a light source configured to emit supplemental light to illuminate at least a portion of the field of view of the vision-based sensor based on the received input.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
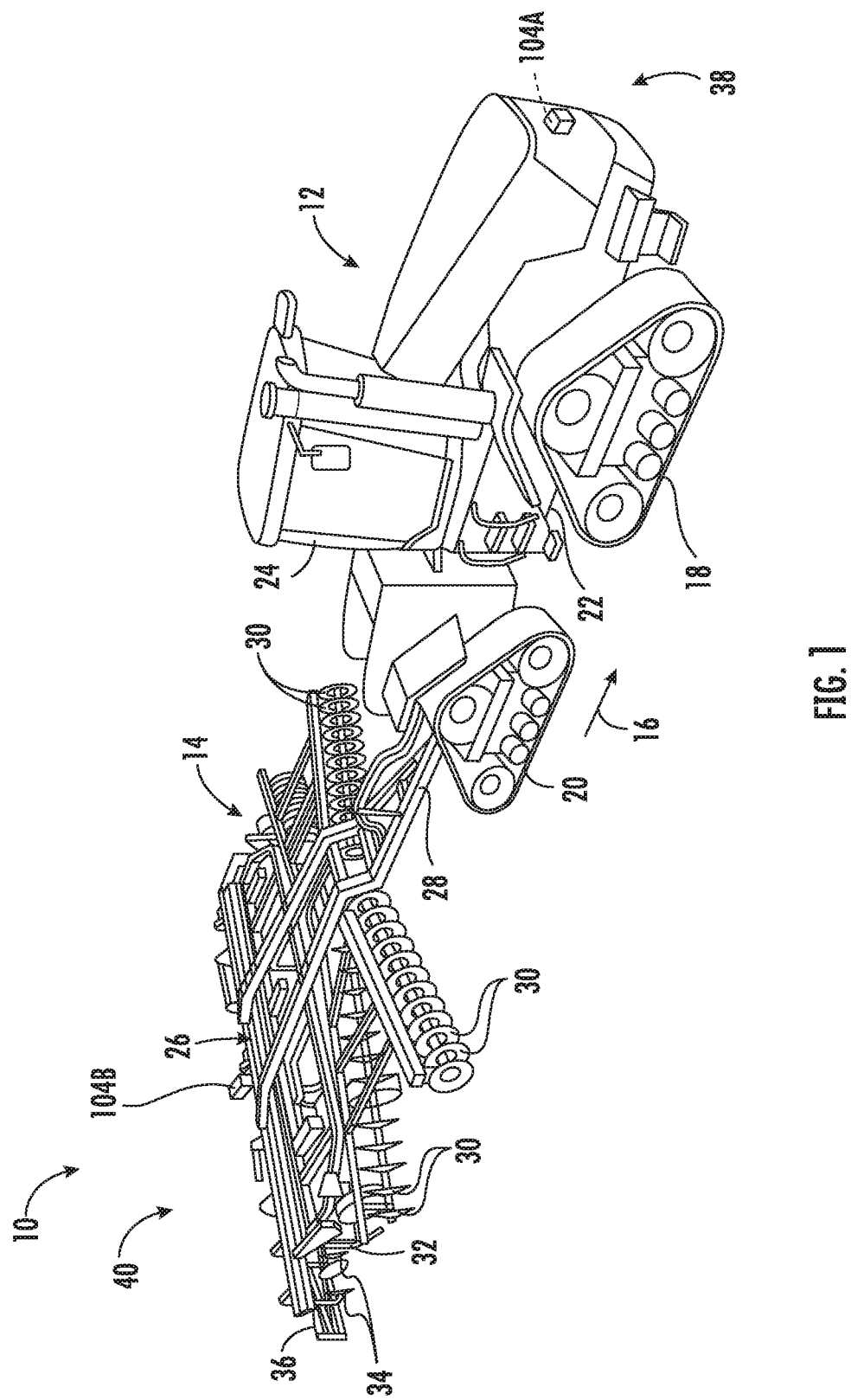
FIG. 1 illustrates a perspective view of one embodiment of an agricultural machine in accordance with aspects of the present subject matter, particularly illustrating the agricultural machine including a work vehicle and associated implement.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for illuminating the field of view of a vision-based sensor mounted on an agricultural machine.

Specifically, in several embodiments, a controller of the disclosed system may be configured to control the operation of a light source based on an input received by the controller that is indicative of the ambient light present within the field of view of the vision-based sensor. For example, in one embodiment, the controller may be configured to receive measurement signals from an ambient light sensor configured to detect the intensity or amount of the ambient light present within the field of view of the vision-based sensor. Based on the received measurement signals, the controller may be configured to monitor the intensity of the ambient light within the field of view relative to a predetermined minimum intensity threshold ambient light set for the vision-based sensor. Thereafter, in the event that the determined intensity of the ambient light falls below the predetermined minimum intensity threshold, the controller may be configured to control the operation of the light source in a manner that provides illumination to at least a portion of the field of view of the vision-based sensor.

Referring now to drawings, FIG. 1 illustrates a perspective view of one embodiment of an agricultural machine 10 in accordance with aspects of the present subject matter. As shown, in the illustrated embodiment, the agricultural machine 10 includes as a work vehicle 12 and an associated agricultural implement 14. In general, the work vehicle 12 is configured to tow the implement 14 across a field in a direction of travel (e.g., as indicated by arrow 16 in FIG. 1). As shown, the work vehicle 12 may be configured as an agricultural tractor and the implement 14 may be configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it should be appreciated that the agricultural machine 10 may correspond to any suitable powered and/or unpowered agricultural machine (including suitable vehicles and/or equipment), such as only a work vehicle or only an implement. Additionally, the agricultural machine 10 may include more than two machines (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14 (e.g., a user interface 102 shown in FIG. 3). Additionally, as is generally understood, the work vehicle 12 may include an engine (not shown) and a transmission (not shown) mounted on the chassis 22. The transmission may be operably coupled to the engine and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. It should be understood that, in addition to being towed by the work vehicle 12, the implement 14 may also be a semi-mounted implement connected to the work vehicle 12 via a two point hitch (not shown) or the implement 14 may be a fully mounted implement (e.g., mounted the work vehicle's 12 three point hitch (not shown)).

Furthermore, in accordance with aspects of the present subject matter, the agricultural machine 10 may include one or more vision-based sensor assemblies 104 coupled thereto and/or supported thereon. As will be described below, each vision-based sensor assembly 104 may include one or more vision-based sensors 106 (FIG. 2) for capturing image data and and/or other vision-based data from the field (e.g., of the soil and/or plants present within the field) across which the agricultural machine 10 is moved. Specifically, in several embodiments, the vision-based sensor assembly(ies) 104 may be provided in operative association with the work vehicle 12 and/or the implement 14 such that the associated vision-based sensor(s) 106 has a field of view or sensor detection range directed towards a portion(s) of the field adjacent to the work vehicle 12 and or the implement 14. For example, as shown in FIG. 1, in one embodiment, one vision-based sensor assembly 104A may be provided at a forward end 38 of the work vehicle 12 to allow the associated vision-based sensor(s) 106 to capture image data of a section of the field disposed in front of the work vehicle 12. Similarly, as shown in FIG. 1, a second vision-based sensor assembly 104B may be provided at or adjacent to an aft and 40 of the implement 14 to allow the associated vision-based sensor(s) 106 to capture image data of a section of the field disposed behind the implement 14. It should be appreciated that, in alternative embodiments, the vision-based sensor assemblies 104A, 104B may be installed at any other suitable location(s) on the work vehicle 12 and/or the implement 14. Furthermore, it should be appreciated that the agricultural machine 10 may include only one vision-based sensor assembly 104 mounted on either the work vehicle 12 or the implement 14 or more than two vision-based sensor assemblies 104 mounted on one or both of the work vehicle 12 or the implement 14.

Figure 2:
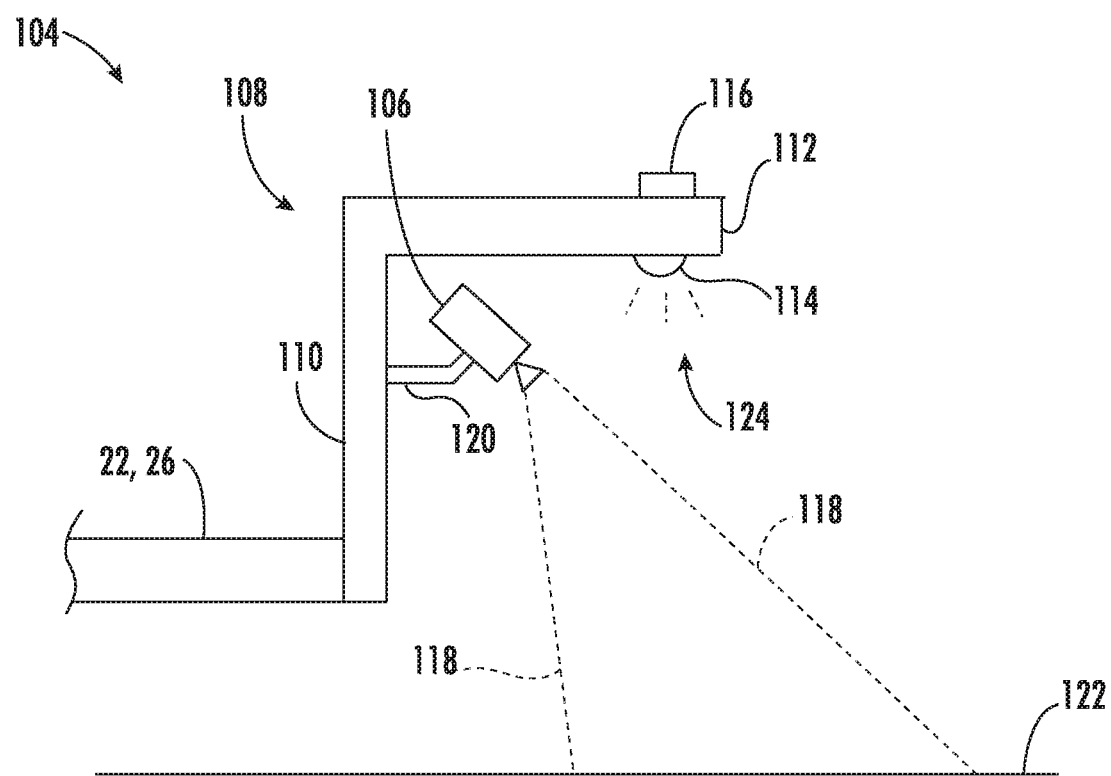
FIG. 2 illustrates a side view of one embodiment of a vision-based sensor assembly mounted on an agricultural machine in accordance with aspects of the present subject matter, particularly illustrating the sensor assembly including a vision-based sensor and a light source.

Referring now to FIG. 2, a side view of one embodiment of a vision-based sensor assembly 104 is illustrated in accordance with aspects of the present subject matter. As shown, in several embodiments, the vision-based sensor assembly 104 may include a mounting frame 108 configured to couple the vision-based sensor assembly 104 to the agricultural machine 10, such as the work vehicle 12 or the implement 14. For example, in one embodiment, the mounting frame 108 may include a first mounting member 110 coupled to the frame 22, 26 of the corresponding work vehicle 12 or implement 14. The mounting frame 108 may also include a second mounting member 112 coupled to the first mounting member 110 in a generally perpendicular manner. Furthermore, the mounting frame 108 may be configured to support one or more components of the vision-based sensor assembly 104 relative to the corresponding work vehicle 12 or implement 14. For example as shown in FIG. 2, in one embodiment, the mounting frame 108 may be configured to support one or more vision-based sensors 106, one or more light sources 114, and one or more ambient light sensors 116. However, it should be appreciated that, in alternative embodiments, the mounting frame 108 may be configured to support any other suitable combination of components. Furthermore, it should be appreciated that the mounting frame 108 may have any other suitable configuration for mounting the various components of the vision-based sensor assembly 104 relative to the work vehicle 12 or the implement 14. Additionally, it should be appreciated that, in further embodiments, the vision-based sensor(s) 106, the light source(s) 114, and the ambient light sensor(s) 116, and/or other components of the vision-based sensor assembly 104 may be mounted directly on work vehicle 12 (e.g., its frame 22) or the implement 14 (e.g., its frame 26).

As indicated above, the vision-based sensor assembly 104 may include one or more vision-based sensors 106, with each vision-based sensor 106 being configured to capture image data or other vision-based data within an associated field of view (e.g., as indicated by dashed lines 118 in FIG. 2). As such, the vision-based sensor(s) 106 may be mounted on or otherwise coupled to the mounting frame 108 of the vision-based sensor assembly 104 in any suitable manner that permits the vision-based sensor(s) 106 to capture image data of the desired section(s) of the field across which the agricultural machine 10 is moved. That is, each vision-based sensor 106 may be mounted on the mounting frame 108 such that the associated field of view corresponds to such desired section(s) of the field. For example, as shown, in one embodiment, the vision-based sensor 106 may be coupled to the first mounting member 110 by an arm 120. However, it should be appreciated that the vision-based sensor(s) 106 may be mounted to any other suitable portion of the mounting frame 108, such as the second mounting member 112, via any other suitable mounting device. Furthermore, although the illustrated vision-based sensor assembly 104 includes one vision-based sensor 106, it should be appreciated that the vision-based sensor assembly 104 may include any other suitable number of vision-based sensors 106, such as two or more vision-based sensors 106.

Moreover, it should be appreciated that the vision-based sensor(s) 106 may correspond to any suitable sensing device(s) configured to detect or capture image data or other vision-based data (e.g., point cloud data) associated with the plants and/or soil present within the associated field of view. For example, in several embodiments, the vision-based sensor(s) 106 may correspond to a suitable camera(s) configured to capture three-dimensional images of the soil surface 122 or the plants present with in the associated field of view. For instance, in a particular embodiment, the vision-based sensor(s) 106 may correspond to a stereographic camera(s) having two or more lenses with a separate image sensor for each lens to allow the camera(s) to capture stereographic or three-dimensional images. However, in alternative embodiments, the vision-based sensor(s) 106 may correspond to Light Detection and Ranging (LIDAR) sensor(s), imaging Radio Detection and Ranging (RADAR) sensor(s), or any other suitable vision-based sensing device(s).

Additionally, the vision-based sensor assembly 104 may include one or more light sources 114, with each light source 114 being provided in operative association with one or more of the vision-based sensors 106. In general, each light source 114 may be configured to emit supplemental light 124 to illuminate at least a portion of the field(s) of view of the associated vision-based sensor(s) 106. Specifically, such supplemental light 124 may generally supplement or otherwise increase the intensity of the ambient light present within the field(s) of view of the associated vision-based sensor(s) 106. As such, the light source(s) 114 may be mounted on or otherwise coupled to the mounting frame 108 of the vision-based sensor assembly 104 in any suitable manner that permits the light source(s) 114 to illuminate the field of view(s) of the associated vision-based sensor(s) 106. For example, as shown, in one embodiment, the light source 114 may be mounted on the second mounting member 112. However, it should be appreciated that the light source(s) 114 may be mounted to any other suitable portion of the mounting frame 108, such as the first mounting member 110. Furthermore, although the illustrated vision-based sensor assembly 104 includes one light source 114, it should be appreciated that the vision-based sensor assembly 104 may include any suitable number of light sources 114, such as two or more light sources 114.

It should be appreciated that the light source(s) 114 may correspond to any suitable light emitting device. For example, in several embodiments, the light source(s) 114 may correspond to one or more light emitting diodes (LEDs). However, in alternative embodiments, the light source(s) 114 may correspond to halogen light emitting device(s), incandescent light emitting device(s), and/or the like.

Furthermore, in one embodiment, the vision-based sensor assembly 104 may include one or more ambient light sensors 116, with each ambient light sensor 116 being provided in operative association with one or more of the vision-based sensors 106. In general, each ambient light sensor(s) 116 may be configured to detect the intensity or amount of ambient light present within the field(s) of view of the associated vision-based sensor(s) 106. As such, the ambient light sensor(s) 116 may be mounted on or otherwise coupled to the mounting frame 108 of the vision-based sensor assembly 104 in any suitable manner that permits the ambient light sensor(s) 116 to detect the intensity or amount of ambient light present within the field(s) of view of the associated vision-based sensor(s) 106. For example, as shown, in one embodiment, the ambient light sensor 116 may be mounted on the second mounting member 112. However, it should be appreciated that the ambient light sensor(s) 116 may be mounted to any other suitable portion of the mounting frame 108, such as the first mounting member 110. Furthermore, although the illustrated vision-based sensor assembly 104 includes one ambient light sensor 116, it should be appreciated that the vision-based sensor assembly 104 may include any suitable number of ambient light sensors 116, such as two or more ambient light sensors 116.

It should be appreciated that the ambient light sensor(s) 116 may correspond to any suitable light sensing device(s). For example, in several embodiments, the ambient light sensor(s) 116 may correspond to one or more photodetectors, such as one or more photo diodes and/or photo transistors.

Additionally, it should be further be appreciated that the configurations of the agricultural machine 10 and vision-based sensor assemblies 104 described above and shown in FIGS. 1 and 2 are provided only to place the present subject matter in an exemplary field of use. Thus, it should be appreciated that the present subject matter may be readily adaptable to any manner of machine and/or assembly configurations.

Figure 3:
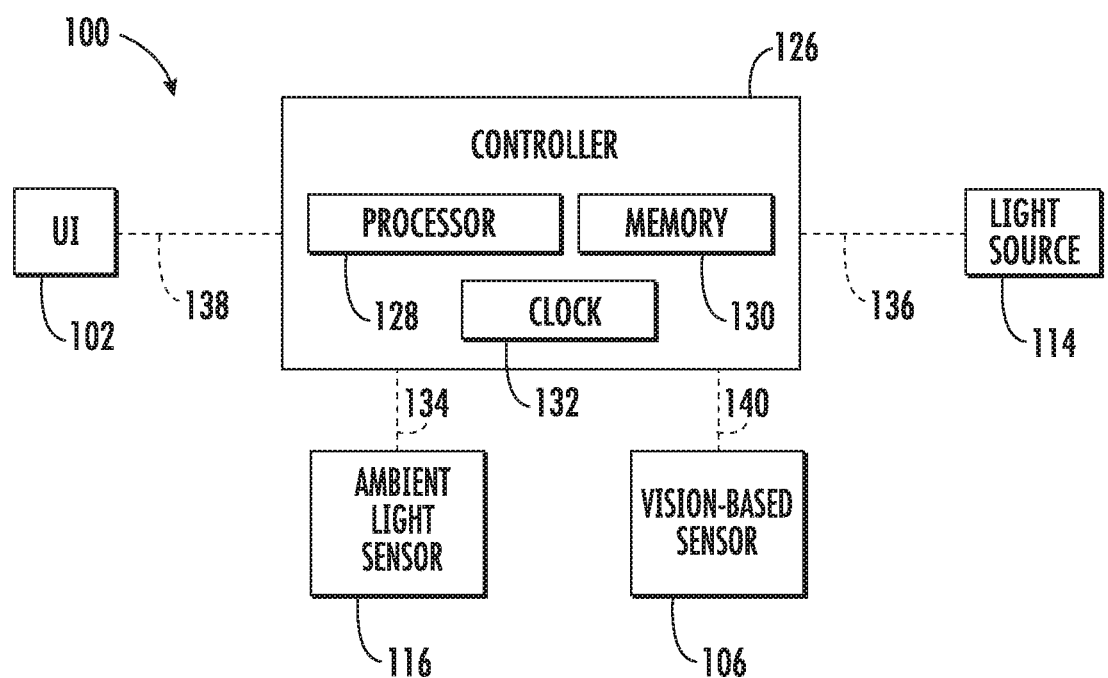
FIG. 3 illustrates a schematic view of one embodiment of a system for illuminating the field of view of a vision-based sensor mounted on an agricultural machine in accordance with aspects of the present subject matter.

Referring now to FIG. 3, a schematic view of one embodiment of a system 100 for illuminating the field of view of a vision-based sensor mounted on an agricultural machine is illustrated in accordance with aspects of the present subject matter. In general, the system 100 will be described herein with reference to the agricultural machine 10 and the vision-based sensor assembly 104 described above with reference to FIGS. 1 and 2. However, it should be appreciated by those of ordinary skill in the art that the disclosed system 100 may generally be utilized with agricultural machines having any other suitable machine configuration and/or vision-based sensor assemblies having any other suitable assembly configuration.

As shown in FIG. 3, the system 100 may include one or more components of the agricultural machine 10 described above with reference to FIGS. 1 and 2. For example, in several embodiments, the system 100 may include the vision-based sensor(s) 106, the light source(s) 114, and the ambient light sensor(s) 116. However, it should be appreciated that the system 100 may include any other suitable components of the agricultural machine 10, such as one or more other components of the work vehicle 12 and/or the implement 14.

Moreover, the system 100 may further include a controller 126 configured to electronically control the operation of one or more components of the agricultural machine 10, such as one or more components of the work vehicle 12 and or the implement 14. In general, the controller 126 may comprise any suitable processor-based device known in the art, such as a computing device or any suitable combination of computing devices. Thus, in several embodiments, the controller 126 may include one or more processor(s) 128 and associated memory device(s) 130 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 130 of the controller 126 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 130 may generally be configured to store suitable computer-readable instructions that, when implemented by the processor(s) 128, configure the controller 126 to perform various computer-implemented functions, such as one or more aspects of the method 200 described below with reference to FIG. 4. In addition, the controller 126 may also include various other suitable components, such as a communications circuit or module, one or more input/output channels, a data/control bus and/or the like. Additionally, in one embodiment, the controller 126 may include an internal clock or other suitable time keeping logic 132 configured to monitor the current time of day as the agricultural machine 10 is moved across the field.

It should be appreciated that the controller 126 may correspond to an existing controller of the work vehicle 12 or the implement 14 or the controller 126 may correspond to a separate processing device. For instance, in one embodiment, the controller 126 may form all or part of a separate plug-in module that may be installed within the work vehicle 12 or implement 14 to allow for the disclosed system and method to be implemented without requiring additional software to be uploaded onto existing control devices of the work vehicle 12 or implement 14.

Furthermore, in one embodiment, the system 100 may also include a user interface 102. More specifically, the user interface 102 may be configured to receive an input from an operator of the agricultural machine 10 (e.g., an operator of the work vehicle 12), such as an input associated with the ambient lighting conditions adjacent to the agricultural machine 10. As such, the user interface 116 may include one or more input devices (not shown), such as touchscreens, keypads, touchpads, knobs, buttons, sliders, switches, mice, microphones, and/or the like. In addition, some embodiments of the user interface 102 may include one or more one or more feedback devices (not shown), such as display screens, speakers, warning lights, and/or the like, which are configured to communicate such feedback from the controller 126 to the operator of the agricultural machine 10. In one embodiment, the user interface 102 may be positioned within the operator's cab 24 of the work vehicle 12. However, in alternative embodiments, the user interface 102 may have any suitable configuration and/or be positioned in any other suitable location within the agricultural machine 10.

In several embodiments, the controller 126 may be configured to receive an input indicative of the ambient light present within the field of view of one or more of the vision-based sensors 106. Specifically, in one embodiment, the controller 126 may be configured to receive such input from the ambient light sensor(s) 116. In this regard, the controller 126 may be communicatively coupled to the ambient light sensor(s) 116, via a wired or wireless connection to allow measurement signals (e.g., as indicated by dashed line 134 in FIG. 3) to be transmitted from the ambient light sensor(s) 116 to the controller 126. As such, the controller 126 may be configured to determine or estimate the current intensity or amount of ambient light present within the field(s) of view of the associated vision-based sensor(s) 106. For instance, the controller 126 may include a look-up table or suitable mathematical formula stored within its memory 130 that correlates the sensor measurements to the current intensity or amount of ambient light present within the field(s) of view.

Moreover, the controller 126 may be configured to control the operation of the light source(s) 114 based on the determined intensity or amount of ambient light present within the field of view of the associated vision sensor 106. Specifically, the controller 126 may be communicatively coupled to the light source(s) 114, via a wired or wireless connection to allow control signals (e.g., as indicated by dashed line 136 in FIG. 3) to be transmitted from the controller 136 to the light source(s) 114. Based on such control signals 136, the light source(s) 114 may be configured to activate or deactivate to provide the supplemental light 124 to the field(s) of view of the associated vision-based sensor(s) 106. For example, the controller 126 may be configured to compare the determined ambient light intensity or amount to a predetermined minimum light intensity or amount threshold. In the event that the determined ambient light intensity or amount falls below the predetermined minimum light intensity or amount (e.g., thereby indicating that too little ambient light is present within the field(s) of view of the associated vision-based sensor(s) 106), the controller 126 may be configured to activate the associated light source(s) 114 to increase the ambient light present within the field(s) of view. Furthermore, after activating the light source(s) 114, the controller 126 may be configured to continue monitoring the intensity or amount ambient light present within the field(s) of view of the associated vision-based sensor(s) 106. In the event that the determined ambient light intensity or amount exceeds a predetermined maximum light intensity or amount threshold (e.g., thereby indicating that too much ambient light is present within the field of view of the associated vision-based sensor 106), the controller 126 may be configured to deactivate the associated light source(s) 114 to decrease the intensity or amount of ambient light present within the field(s) of view.

Furthermore, in one embodiment, the controller 126 may be configured to control the intensity of the supplemental light 124 emitted by the light source(s) 114 after activation thereof. Specifically, after activating the light source(s) 114, the controller 126 may be configured to monitor the intensity or amount of ambient light present within the field(s) of view of the associated vision-based sensor(s) 106. In the event that the determined intensity or amount of ambient light present within the field of view remains below the predetermined minimum ambient light intensity or amount threshold after activation of the associated light source(s) 114, the controller 126 may be configured to control the operation of such light source(s) 114 to increase the intensity of the supplemental light 124 emitted thereby. Conversely, the controller 126 may also be configured to control the operation of the light source(s) 114 to decrease the intensity of the supplemental light 124 emitted thereby, such as when it is determined that the supplemental light 124 is needed, but the current intensity of the supplemental light 124 is too great. It should be appreciated that, during operation of the agricultural machine 10, the controller 126 may be configured to continuously monitor the intensity or amount of ambient light present within the field(s) of view of the vision-based sensor(s) 106. Based on the monitored intensity or amount of ambient light, the controller 126 may be configured to continuously activate and deactivate the associated light source(s) 114 and/or adjust the intensity of the supplemental light 124 emitted by such light source(s) 114 to maintain a generally constant intensity or amount of ambient light present within the field(s) of view of the vision-based sensor(s) 106.

In another embodiment, the input indicative of the ambient light present within the field(s) of view of one or more of the vision-based sensors 106 may be associated with the current time of day. As indicated above, the clock 132 of the controller 126 may monitor the current time of day during operation of the agricultural machine 10. Thereafter, the controller 126 may be configured to transmit suitable control signals 136 the light source(s) 114 to activate and deactivate the light source(s) 114 and/or adjust the intensity of the supplemental light 124 provided thereby based on the current time of day. For example, the controller 126 may be configured to activate the light source(s) 114 during dusk and/or nighttime hours and deactivate the light source(s) 114 during daytime hours. As such, the controller 126 may include a look-up table or suitable mathematical formula stored within its memory 130 that correlate the current time of day to the operational status (e.g., activated or deactivated) of the light source(s) 116.

In a further embodiment, the input indicative of the ambient light present within the field(s) of view of the vision-based sensor(s) 106 may be received from the operator of the agricultural machine 10, such as the operator of the work vehicle 12. Specifically, the controller 126 may be communicatively coupled to the user interface 102, via wired or wireless connection to allow user feedback signals (e.g., as indicated by dashed line 138 in FIG. 3) to be transmitted from the user interface 102 to the controller 126. Based on such user feedback signals 138, the controller 126 may be configured to activate or deactivate the light source(s) 114. Furthermore, based on the user feedback signals 138, the controller 126 may be configured to adjust the intensity of the supplemental light 124 emitted by the light source(s) 114. It should be appreciated that the operator of the agricultural machine 10 may control the operation of all of the light sources 114 simultaneously or may control the operation of individual light sources 114 or groups of light sources 114 independently of each other.

In yet another embodiment, the input indicative of the ambient light present within the field(s) of view of the vision-based sensor(s) 106 may be image data received from the vision-based sensor(s) 106. Specifically, the controller 126 may be communicatively coupled to the vision-based sensor(s) 106 via wired or wireless connection to allow image data (e.g., as indicated by dashed line 140 in FIG. 3) to be transmitted from the vision-based sensor(s) 106 to the controller 126. Thereafter, the controller 126 may be configured to process or analyze the received image data 140 to identify one or more features within such image data 140 that are indicative of low ambient light conditions. For example, such features may include shadows, dark spots, dark pixels, and/or any other feature(s) present with in the image data 140 caused by or otherwise indicative of low ambient light conditions. In this regard, the controller 126 may include any suitable image processing algorithms stored within its memory 130 or otherwise use any suitable image processing techniques to identify the presence of features within the image data 140 indicative of low ambient light conditions.

Moreover, the controller 126 may be configured to control the operation of the light source(s) 114 based on the presence of features associated with low ambient light conditions. Specifically, when such features are present within the image data 140 (e.g., thereby indicating that a shadow is present within the field of view of the associated vision sensor 106), the controller 126 may be configured to transmit suitable control signals 136 to the light source(s) 114 instructing the light source(s) 114 to activate, thereby providing supplemental light 124 to the field(s) of view of the associated vision-based sensor(s) 106. Furthermore, after activating the light source(s) 114, the controller 126 may be configured to continue monitoring the received image data 140 for the features associated with low ambient light conditions. In the event that such features are still present after activation of the light source(s) 114 (e.g., thereby indicating that the current intensity of the supplemental light 124 is insufficient to eliminate the shadows within the image data 140), the controller 126 may be configured to control the operation of the associated light source(s) 114 to increase the intensity or amount of ambient light present within the field(s) of view. Additionally, in one embodiment, the controller 126 may be configured to transmit suitable control signals 136 to the light source(s) 114 instructing the light source(s) 114 to deactivate after a predetermined time period has elapsed since activation thereof.

Additionally, in one embodiment, the controller 126 may be configured to control the operation of the light source(s) 114 based on the color of the soil or residue within the field. In certain instances, the vision sensor(s) 106 may capture low quality image data 140 when certain soil and/or residue types (e.g., especially dark soils and/or residues) are present within the field. Specifically, in such embodiment, the controller 126 may be configured to process or analyze the received image data 140 to identify one or more one or more parameters associated with a color of the soil and/or the residue within the field. For example, such parameters may include the soil or residue color, type, reflectivity, and/or any other suitable associated with the color of the soil and/or residue. In this regard, the controller 126 may include any suitable image processing algorithms stored within its memory 130 or otherwise use any suitable image processing techniques to identify the parameters associated with the soil residue color from the image data 140. Thereafter, when he determined soil or residue color is associated with poor quality image data 140 (e.g., a dark colored soil or residue), the controller 126 may be configured to transmit suitable control signals 136 to the light source(s) 114 instructing the light source(s) 114 to activate, thereby providing supplemental light 124 to the field(s) of view of the associated vision-based sensor(s) 106. Such supplemental light 124 may improve the quality of the image data 140 captured by the vision-based sensor(s) 106. Furthermore, after activating the light source(s) 114, the controller 126 may be configured to continue monitoring the received image data 140 fourth of parameters associated with the color of the soil and/or residue. In the event that the soil and/or residue color changes to a color associated with high quality image data 140 (e.g., light colored soil residue), the controller 126 may be configured to transmit suitable control signals 136 to the light source(s) 114 instructing the light source(s) 114 to deactivate.

Figure 4:
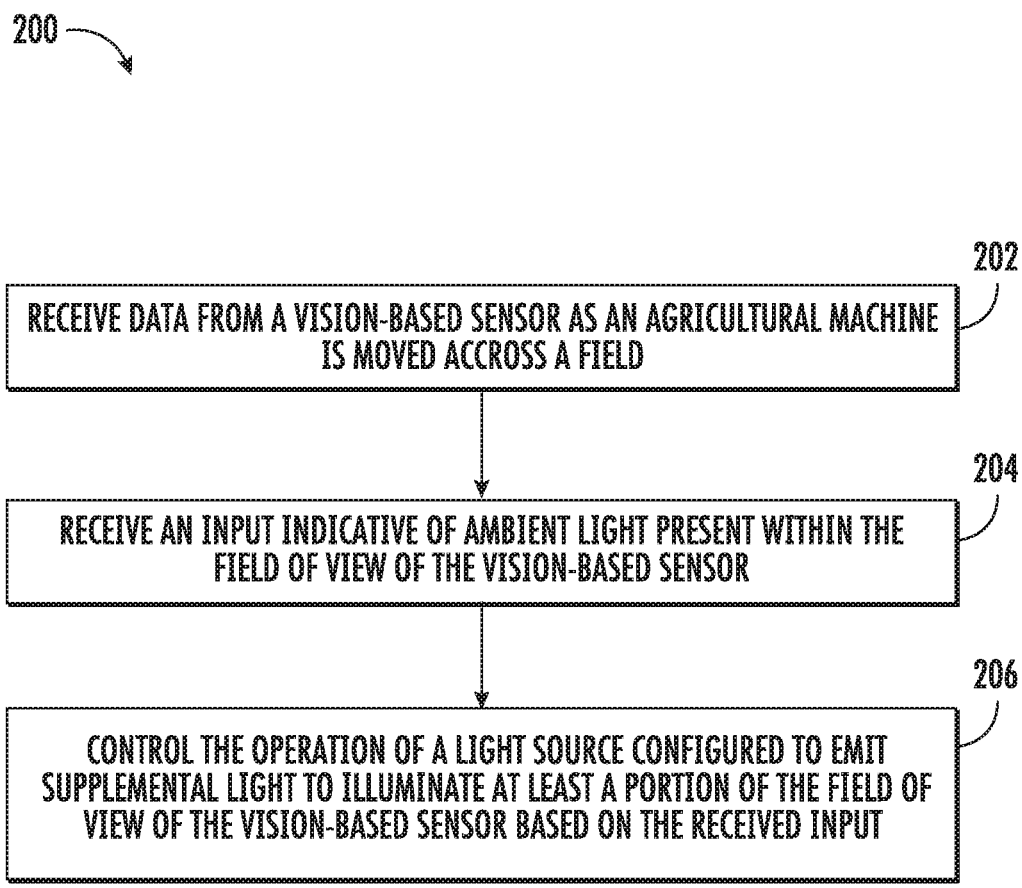
FIG. 4 illustrates a flow diagram of one embodiment of a method for illuminating the field-of-view of the vision-based sensor mounted on an agricultural machine in accordance with aspects of the present subject matter.

Referring now to FIG. 4, a flow diagram of one embodiment of a method 200 for illuminating the field of view of a vision-based sensor mounted on an agricultural machine is illustrated in accordance with aspects of the present subject matter. In general, the method 200 will be described herein with reference to the agricultural machine 10 and the system 100 described above with reference to FIGS. 1-3. However, it should be appreciated by those of ordinary skill in the art that the disclosed method 200 may generally be utilized to illuminate the field of view of any vision-based sensor mounted on any agricultural machine having any suitable machine configuration and/or in connection with any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving, with a computing device, data from the vision-based sensor as the agricultural machine is moved across a field. For instance, as described above, the controller 126 may be communicatively coupled to one or more vision-based sensors 106. As such, vision data 140 indicative of the plant and/or soil conditions present within the field(s) of view of the vision-based sensor(s) 106 may be received by the controller 126.

Additionally, at (204), the method 200 may include receiving, with the computing device, an input indicative of ambient light present within the field of view of the vision-based sensor. For instance, as described above, in one embodiment, the controller 126 may be communicatively coupled to one or more ambient light sensors 116. As such, measurement signals 134 indicative of the ambient light present within the field(s) of view of the associated vision-based sensor(s) 106 may be received by the controller 126. In another embodiment, the input may be associated with to the current time of day as monitored by the clock 132 of the controller 126. In a further embodiment, the controller 126 may be communicatively coupled to the user interface 102. As such, user input signals 138 indicative of the desired operational status (e.g., activated or deactivated) of the light source(s) 114 may be received by the controller 126. In yet another embodiment, the input may correspond to the image data 140 received by the controller 126 from the vision-based sensor(s) 106.

Moreover, as shown in FIG. 4, at (206), the method 200 may include controlling, with the computing device, an operation of a light source configured to emit supplemental light to illuminate at least a portion of the field of view of the vision-based sensor based on the received input. For instance, as described above, the controller 126 may be configured to determine when lowlight conditions are present within the field(s) of view of the vision-based sensor(s) 106 based on the above received inputs. Thereafter, in the event that such low ambient light conditions exist within the field(s) of view, the controller 126 may be configured to transmit suitable control signals 136 to the light source(s) 114 instructing the light source(s) 114 to activate, thereby providing the supplemental light 124 to the field(s) of view of the vision-based sensor(s) 106.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for illuminating a field of view of a vision-based sensor mounted on an agricultural machine, the system comprising:
   an agricultural machine including a vision-based sensor;
   a light source configured to emit supplemental light to illuminate at least a portion of the field of view of the vision-based sensor; and
   a controller communicatively coupled to the light source, the controller configured to:
      determine one or more parameters associated with a color of soil or residue present within a field across which the agricultural machine is traveling based on images received from the vision-based sensor; and
      control an operation of the light source based on the determined one or more parameters.

2. The system of claim 1, wherein the controller is further configured to control the operation of the light source based on an input associated with a current time of day in addition to the determined one or more parameters.

3. The system of claim 1, wherein the controller is further configured to control the operation of the light source based on an operator input from an operator of the agricultural machine in addition to the determined one or more parameters.

4. The system of claim 1, wherein the controller is further configured to activate the light source when it is determined that a feature associated with low ambient light is present within one or more of the received images.

5. The system of claim 4, wherein the feature associated with low ambient light comprises at least one of a shadow or a dark spot.

6. The system of claim 4, wherein, after activating the light source, the controller is configured to initiate an increase an intensity of the emitted supplemental light when it is determined that the feature associated with low ambient light is present within one or more of the received images.

7. The system of claim 4, wherein the vision-based sensor comprises a camera.

8. The system of claim 4, wherein the controller is further configured to:
   determine the color of the soil present within the field across which the agricultural machine is traveling based on images received from the vision-based sensor; and
   control the operation of the light source based on the determined color of the soil.

9. The system of claim 4, wherein the controller is further configured to:
   determine the color of the residue present within the field across which the agricultural machine is traveling based on images received from the vision-based sensor; and
   control the operation of the light source based on the determined color of the residue.

10. A method for illuminating a field of view of a vision-based sensor mounted on an agricultural machine, the method comprising:
    receiving, with a computing device, images from the vision-based sensor as the agricultural machine is moved across a field,
    determining, with the computing device, one or more parameters associated with a color of soil or residue present within a field across which the agricultural machine is traveling based on the received images; and
    controlling, with the computing device, an operation of a light source configured to emit supplemental light to illuminate at least a portion of the field of view of the vision-based sensor based on the determined one or more parameters.

11. The method of claim 10, wherein controlling the operation of the light source comprises controlling, with the computing device, the operation of the light source based on an input associated with a current, time of day in addition to the determined one or more parameters.

12. The method of claim 10, wherein controlling the operation of the light source comprises controlling, with the computing device, the operation of the light source based on an operator input from an operator of the agricultural machine in addition to the determined one or more parameters.

13. The method of claim 10, further comprising:
    activating, with the computing device, the light source when it is determined that a feature associated with low ambient light is present within one or more of the received images.

14. The method of claim 13, wherein the feature associated with low ambient light comprises at least one of a shadow or a dark spot.

15. The method of claim 13, further comprising:
    after activating the light source, initiating, with the computing device, an increase an intensity of the emitted supplemental light when it is determined that the feature associated with low ambient light is present within one or more of the received images.

16. The method of claim 10, wherein:
    determining the one or more parameters comprises determining, with the computing device, the color of the soil present within the field across which the agricultural machine is traveling based on the received images; and
    controlling the operation of the light source comprises controlling, with the computing device, the operation of the light source based on the determined color of the soil.

17. The method of claim 10, wherein:
    determining the one or more parameters comprises determining, with the computing device, the color of the residue present within the field across which the agricultural machine is traveling based on the received images; and
    controlling the operation of the light source comprises controlling, with the computing device, the operation of the light source based on the determined color of the residue.

* * * * *